Patented Dec. 10, 1940

2,224,397

UNITED STATES PATENT OFFICE 2,224,397

MANUFACTURE OF DRIED BEEF

Stephan L. Komarik, Chicago, Ill., assignor to The Griffith Laboratories, Inc., Chicago, Ill., a corporation of Illinois No Drawing. Application August 8, 1938, Serial No. 223,700

6 Claims. (Cl. 99—108)

The present invention relates to drying of beef to provide a commercial "dried beef."

Dried beef heretofore has been made by a process which takes a long time. It is usually made from knuckles of the hind quarter, although choice parts such as the beef ham are used. The parts are selected so that after processing they provide a solid product suitable for slicing. The beef parts to be used are trimmed of fat, sinews and connecting tissues, and are divided into chunks in groups according to size and character. These groups are cured separately in liquid pickle vats, because the size and character of the group determines the details of processing to give the desired final product. The curing time and concentration of curing salt in the pickle need to be adjusted differently for the different groups. Chunks are often over-cured or under-cured, and hence wasted. For example, one group may be placed in a sodium chloride brine (salimeter reading 70°) for 7 or 8 hours to remove blood and slime prior to curing. Then the group is placed in an open vat with 70° brine, with added curing salt of nitrite or nitrate or both for 20 to 50 days. The pieces require overhauling about every 5 days, involving cleaning and change of pickle solution. Thereafter the meat is soaked about 10 minutes for each day of the curing. Then the soaked meat is drained and dried in a dry-room or smokehouse (equipped with steam coils). The drying period depends upon the size of the pieces. The final water content is about 55%.

The process is so involved that some spoilage easily occurs. It takes a long time and much labor. The process is a divided one, according to the number of groups involved. The cost and waste of brine and curing salts is considerable. The salt content of the several groups is variable and always too high to be palatable for consuming the product raw. It thus must be used in prepared dishes, for example, "creamed chipped beef." Sometimes the chunks dry with a hard shell and a soft interior. The interior is sometimes too soft for slicing. The interior of each piece is usually different from the exterior. Thus, when sliced, there is lack of uniformity in single slices, as well as from slice to slice.

The present invention aims to operate by a single processing for all the parts of meat involved; to avoid spoilage; to accomplish the curing and the drying in a much shorter time; to make the ultimate product of uniform quality by uniformly blending all the parts of the meats involved; to provide a tenderized product free from long fibers or stringiness; to provide a solid product of pretermined size and shape which can be cut and sliced to self-sustaining wafer-thin slices like the well-known commercial "chipped beef" or "dried beef"; and to produce a product of uniform saltiness, not too high to be palatable for raw consumption. All or some of the foregoing objectives may be accomplished by the present invention.

One important feature of dried beef is the lack of fat. Heretofore this is trimmed away. It has been found that the present invention gives best results when the trimming away of fat is more severe than the usual trimming practice. The latter of course varies from time to time and from plant to plant and is by no means a fixed standard. As in the prior art a minimum of fat is desirable for the present invention, and the present invention involves nothing new in principle regarding the fat over the prior art.

By the present invention the severely trimmed pieces of the type of meat used in the prior art for dried beef and any other beef parts, are cut into small but coarse uniformly sized pieces in a coarse-grinding machine cutter. In this condition it is mixed with a measured amount of sodium chloride to suit the ultimate taste, with or without curing salts to heighten the color and with or without spicing or other flavoring agents as desired. Several days standing in a chilled mass salts and cures the meat uniformly. Then it is cut finer. The fine meat is stuffed under high pressure into cloth bags and therein forced into a mould to acquire a predetermined and compressed shape. The moulded bagged meat is cooked whereby it is set as a single mass, then stripped of its bags, placed in stockinettes, and smoked and dried. The details of the steps may vary considerably. A detailed illustration of the process is given as it is practiced for "dried beef."

The meat parts are first selected, the fat severely trimmed, and sinews and connecting tissues removed. The pieces are ground through the ½ inch plate of a meat grinder. Where it is desired to develop the familiar "ripe" flavor of beef, the cut meat is kept for a time such as 12 hours in a chilled room of 34°–36° F. The chilled meat is mixed with that amount of sodium chloride which gives the desired ultimate saltiness, for example, 5 to 6 parts of sodium chloride to 100 parts of meat. Where additional curing or heightening of the red color is desired, the usual nitrite or nitrate curing salts may be added. The preferred curing salt is one having nitrite and nitrate mutually combined, and carried by sodium chloride, as set forth in Griffith U. S. Patent No. 2,054,624, and sold as "Prague powder" by The Griffith Laboratories, Inc., Chicago, Illinois. About 6 ounces of such "Prague powder" may be used per 100 pounds of meat. Where a spice flavor is desired, spicing agents may be added in the usual way. Other flavoring material may be added, for example olive oil in small quantity, such as from 4 to 12 ounces per 100 lbs. of meat. This, like spicing, does not function in the curing process, so such materials may be added later, as for example after fine grinding.

The salted coarse-ground meat is packed into screen trays to a depth of 4 to 5 inches and placed in a chilled room of 34°-36° F. for roughly three days. The modern air-conditioned room is preferred to maintain uniform treatment in successive batches, and also uniformity of conditions for all the trays of one batch. During this time curing takes place, and a binding quality develops which later functions. The coagulatable proteins are more or less released as the salt drives the juices out of their natural locations in the meat. Later, the heat in cooking coagulates these proteins and binds the small particles together.

After the curing, the meat is finely ground to any desired degree, for example through a $\frac{3}{4}$ inch plate. This is a mechanical tenderizing step in the process, of importance where poorer grades or fibrous meat are present. The longer strings of fiber commonly encountered in "chipped beef" are thus cut into many short fibers. The fine-ground meat is bagged under high mechanical pressure into forming moulds. These may provide "squares" for slicing. For example, a convenient size of slab 12" x 5½" x 2" is just the right size for slicing to fill certain sized glass jars in a certain way for sanitarily packaged dried beef.

The forming moulds may be open to permit quick contact with cooking water without serious disadvantage. The moulded beef is placed into hot water in a cooking vat and cooked until all of the beef has attained a temperature of at least 150° F. The time depends upon the size and shape of the moulded meat. This heating first heats the outside and seals the same quite effectively by coagulating the protein. The sealing keeps the juices, salt and flavor in the moulded product. As heat penetrates the coagulation binds the mass more and more into a unitary bulk of tender beef.

After cooking, the bags are replaced by stockinettes for convenience in drying and smoking in any desired manner. When the meat has cooled to 80° F. it is transferred to a smokehouse (120° F.) and a light smoke maintained for 8 hours. Then the temperature is gradually raised to 160° F. and the meat kept at this temperature to dry for 4 hours. It is then allowed to cool to 80° F. After this it is ready for storage or slicing. The meat slices excellently to wafer-like thinness, and holds together firmly. The dried slabs or the slices may be kept perfectly in chilled rooms or at ordinary temperatures without danger of spoilage. The water content may vary from 55% to 70%, which is considered normal for "dried beef."

The known "dried beef" is not very popular on the market because it has a very high salt content of say about 10% requiring it to be specially prepared. The pieces are irregular in shape, and variable in quality. Many slices are found which have long strings or fibers. Some grades are much tougher than others, but even in the best grades there may be tough slices. It cannot readily be served without freshening.

The present invention provides an improved dried beef of uniform but lower and easily controlled salt content, so that it can be used for chipped beef or eaten directly. It provides a uniform product, in which each slice is like the other. It permits uniform sizes for slices. In spite of the fact that it may be made of meat which would give tough and stringy slices by the prior art process, the meat is free from strings and fibers and is tender. Because it is made without soaking in liquid pickle or in water, it contains more of the natural meat products, has a better flavor, and is nearer to the solid meat. The "ripened" beef flavor may readily be produced, and then is retained, because the process has no steps in which the "ripe" flavor may be washed away. It permits ready spicing or flavoring. Where a vegetable oil is used, it imparts a delicate and distinctive flavor which could not be introduced into dried beef of the prior art. It also makes the slices more pliable, and when exposed, keeps the moisture in the slices for a longer time.

I have described coarse-grinding, then curing, and it is to be understood that this is an essential sequence or combination. Coarse-grinding, then curing, then final grinding, is only the preferred procedure to produce a high degree of uniformity. The first grinding may be the ultimate grinding if desired. A first grinding is desired to produce uniformity of sizes of beef, so that the curing is more quickly accomplished, and so that it is uniform in the resulting short time. Two grindings are preferred because the last one provides finer particles and greater uniformity, shorter fibers and greater tenderness, and also a final mixing for better homogeneity on moulding to the final form. The second grinding assures fresh-cut meat surfaces for the binding action in cooking and avoids any film formation which might define the cured pieces when compressed and cooked without the second grinding. Were the fine grinding omitted for the process described, the product would still fall within the invention as broadly contemplated, but the sliced product would more clearly evidence the individual pieces of the coarse-ground product, and would appear less like the commercial dried beef of the prior art. Therefore, although I have described and claimed the preferred process, the product and the selection of the meat the invention is not to be considered as limited short of its scope as expressed in the appended claims.

I claim:

1. The method of making a "dried beef" product, which comprises trimming beef meat to form chunks of lean relatively free from fat, sinews and non-lean tissue, coarse-grinding the chunks to uniformity of size, mixing the coarse-ground meat with sodium chloride for the ultimate taste, curing the salted meat in a thick layer for about three days in a room near 32° F., fine-grinding the cured meat, compressing the meat into moulds to form a uniform solid mass, cooking the compressed meat until all the meat attains a temperature of 150° F., cooling the cooked meat, and exposing the cooked meat to drying air and smoke to dry and smoke the meat.

2. The method of making a "dried beef" product, which comprises trimming beef meat to form chunks of lean relatively free from fat, sinews and non-lean tissue, coarse-grinding the chunks to uniformity of size, mixing the coarse-ground meat with sodium chloride for the ultimate taste, curing the salted meat in a thick layer for about three days in a room near 32° F., fine-grinding the cured meat, compressing the meat into moulds to form a uniform solid mass, cooking the compressed meat until all the meat attains a temperature of 150° F., cooling the cooked meat, smoking and drying the meat for about 8 hours at 120° F., raising the temperature to 160° F. and thereafter drying the meat for 4 hours at 160° F. to a water content of 55% to 70%.

3. The method of making a dried beef which comprises coarse-grinding raw lean beef to provide a mass of uniformly sized pieces of beef, curing said beef by mixing with curing salt comprising essentially sodium chloride and chilling the salted mass for about 3 days, fine-grinding the cured meat mass, compressing the fine-ground meat into moulds, cooking the compressed moulded meat until it all attains a temperature of at least 150° F., whereby the mass is integrated, and smoking and drying the cooked meat to form a body of dried beef having from 55% to 70% moisture.

4. The method of claim 3 with the additional step of slicing the meat to provide integral slices.

5. The process of making a dried beef product which comprises mixing lean beef particles and sodium chloride particles, curing the salted meat mass whereby to release heat-coagulatable protein, compressing the resulting mass into a form, cooking the compressed mass whereby to coagulate protein and bind the pieces together, and smoking and drying the integrated body.

6. The process of making a dried beef product from irregular sized pieces of beef for the purpose, comprising reducing the irregular sizes to smaller sizes so that the resulting pieces are of one fineness for uniformity of curing together, curing the said pieces together in a mass with a dry salt cure, compressing the product resulting from the cure into one or more solid moulded bodies, cooking the moulded beef until all the meat has attained a temperature of at least 150° F., whereby the mass is integrated, and drying and smoking the integrated meat, whereby a solid sliceable product results.

STEPHAN L. KOMARIK.